United States Patent [19]
Gareiss et al.

[11] Patent Number: 6,093,759
[45] Date of Patent: Jul. 25, 2000

[54] FIREPROOFED THERMOPLASTIC MOULDING MASSES

[75] Inventors: Brigitte Gareiss, Obersülzen; Hans-Michael Schneider, Worms; Martin Weber, Maikammer, all of Germany

[73] Assignee: BASF Aktiengesellschaft, Ludwigshafen, Germany

[21] Appl. No.: 09/171,197

[22] PCT Filed: Apr. 17, 1997

[86] PCT No.: PCT/EP97/01912

§ 371 Date: Oct. 15, 1998

§ 102(e) Date: Oct. 15, 1998

[87] PCT Pub. No.: WO97/40092

PCT Pub. Date: Oct. 30, 1997

[30] Foreign Application Priority Data

Apr. 18, 1996 [DE] Germany ............... 196 15 230

[51] Int. Cl.⁷ ..................................... C08K 3/32
[52] U.S. Cl. ............... 524/122; 524/116; 524/121; 524/415; 524/499; 524/523; 524/525; 524/556; 524/599; 524/601; 524/604; 524/605; 524/606; 524/607; 523/452; 523/506; 528/398
[58] Field of Search .................... 524/116, 121, 524/122, 415, 499, 523, 525, 556, 599, 601, 604, 605, 606, 607; 523/452, 506; 528/398

[56] References Cited

U.S. PATENT DOCUMENTS

| | | | |
|---|---|---|---|
| 3,332,905 | 7/1967 | Teter . | |
| 4,044,104 | 8/1977 | Cremer et al. ............... | 423/302 |
| 4,946,885 | 8/1990 | Weil et al. ............... | 524/415 |
| 5,578,659 | 11/1996 | Anada et al. ............... | 523/212 |

FOREIGN PATENT DOCUMENTS 417 839  3/1991  European Pat. Off. .

OTHER PUBLICATIONS

Gmelin's Handbush der Anorganischen Chemie, 8th Ed., System No. 16, Part C, Verlag Chemie, Weinheim/Bergstr, 1965.
Journal of the Chemical Society, M.C. Miller et al., pp. 3233–3236, 1963.
The Use of Phosphazenes as Fire Resistant Materials, Allen, Jr. of Fire Sci., vol. 11, Jul./Aug. 1993, 320–328.

*Primary Examiner*—Robert Dawson
*Assistant Examiner*—Kuo-Liang Peng
*Attorney, Agent, or Firm*—Keil & Weinkauf

[57] ABSTRACT

Flame-retardant thermoplastic molding compositions comprise

A) from 5 to 99% by weight of a thermoplastic polymer,
B) from 0.1 to 50% by weight of a phosphazene of the general formula I $$(PN_{2-x}H_{1-y})_z \qquad I$$

where the numerical values of x, y and z, independently of one another, are as follows:
$1 > x > 0.05$
$1 > y > 0.05$
$z > 1$, and C) from 0 to 70% by weight of other additives and processing aids, where the total of the percentages by weight of components A) to C) is 100%.

8 Claims, No Drawings

FIREPROOFED THERMOPLASTIC MOULDING MASSES

The invention relates to flame-retardant thermoplastic molding compositions, comprising
- A) from 5 to 99% by weight of a thermoplastic polymer,
- B) from 0.1 to 50% by weight of a phosphazene of the general formula I $$(PN_{2-x}H_{2-y})_z \qquad \text{I}$$

where the numerical values of x, y and z, independently of one another, are as follows:
$1 > x > 0.05$
$1 > y > 0.05$
$z > 1$, and
- C) from 0 to 70% by weight of other additives and processing aids, where the total of the percentages by weight of components A) to C) is 100%.

The invention also relates to the use of the novel molding compositions for producing fibers, films and moldings, and also to the resultant moldings.

One of the disadvantages of halogen-containing flame-retardant thermoplastics is that they are toxicologically hazardous, and to an increasing extent they are being replaced by halogen-free flame-retardant thermoplastics.

Important requirements for flame-retardant systems of this type are in particular a pale intrinsic color, adequate heat resistance during incorporation into the thermoplastics, and also the retention of efficacy when fibrous fillers are added ("wicking" effect with glass fibers, adversely affecting flame-retardancy).

Besides red phosphorus, there are four other possible halogen-free flame retardants.

1) Inorganic flame retardants based on hydroxides or on carbonates, in particular of magnesium. Large amounts of these have to be used to be sufficiently effective.

2) Nitrogen-containing flame retardants, such as melamine cyanurate. These mostly exhibit adequate flame retardancy only in unreinforced thermoplastics.

3) Phosphorus compounds, such as triphenylphosphine oxide as flame retardant. In many thermoplastics, these have an undesirable plasticizing side-effect.

4) Ammonium polyphosphates or melamine phosphate. These do not have adequate thermal stability above 200° C.

Phosphazenes and their effectiveness as flame-retardants in thermoplastics have been disclosed in U.S. Pat. No. 3,332,905 and in C. W. Allen, Journal of Fire Sciences 11, 1993, p. 320–328.

EP-A 417 839 has disclosed the addition of a phospham of the formula $(PN_2H)_x$ as a flame retardant for thermoplastics. Thermo-gravimetric studies in EP-A 417 839 have shown that $(PN_2H)_x$ is heat-resistant up to 390° C., but has disadvantages in other flame-retardant properties, since there is no crust formation on ignition and this makes it necessary to add an antidrip agent to prevent burning drops, and also an additive to promote carbonization.

It is an object of the present invention to provide a flame retardant for thermoplastics which gives adequate crust formation and carbonization on ignition, and does not give burning drops.

We have found that this object is achieved by means of the molding compositions defined at the outset. Preferred embodiments are given in the subclaims.

Surprisingly, the addition of a highly crosslinked phosphazene gives flame-retardant molding compositions which do not give burning drops and have adequate crust formation and carbonization. This is surprising because highly crosslinked phosphazenes are very thermally stable, i.e. chemically inert, and thus should have poorer effectiveness.

The novel molding compositions comprise, as component A) from 5 to 99% by weight, preferably from 10 to 80% by weight and in particular from 30 to 80% by weight of a thermoplastic polymer.

In principle, the advantageous effect in the novel molding compositions is apparent with thermoplastics of any type. A list of suitable thermoplastics is found, for example, in Kunststoff-Taschenbuch (ed. Saechtling), 1989 edition, in which supply sources are also mentioned. Processes for preparing such thermoplastics or thermosets are known per se to the person skilled in the art. Some preferred plastics types will be described below in somewhat more detail.

1. Polyoxymethylene homo- or copolymers

Polymers of this type are known per se to the person skilled in the art and are described in the literature.

Very generally, these polymers have at least 50 mol % of recurring —CH$_2$O— units in the main polymer chain.

The homopolymers are generally prepared by polymerizing formaldehyde or trioxane, preferably in the presence of suitable catalysts.

For the purposes of the invention, preference is given to poly-oxymethylene copolymers, in particular those which, besides the recurring —CH$_2$O— units, also have up to 50 mol %, preferably from 0.1 to 20 mol % and in particular from 0.3 to 10 mol %, of recurring units

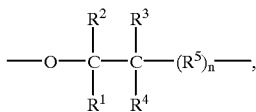

where $R^1$ to $R^4$, independently of one another, are hydrogen, $C_1$–$C_4$-alkyl or halo-substituted alkyl having from 1 to 4 carbon atoms, and $R^5$ is —CH$_2$—, —CH$_2$O—, $C_1$–$C_4$-alkyl- or $C_1$–$C_4$-haloalkyl-substituted methylene, or a corresponding oxymethylene group, and n is in the range from 0 to 3. These groups may advantageously be introduced into the copolymers by ring-opening of cyclic ethers. Preferred cyclic ethers are those of the formula

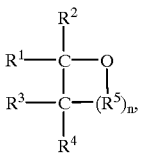

where $R^1$ to $R^5$ and n are as defined above. Merely as examples, mention may be made of ethylene oxide, propylene 1,2-oxide, butylene 1,2-oxide, butylene 1,3-oxide, 1,3-dioxane, 1,3-dioxolane and 1,3-dioxepan as cyclic ethers, and also linear oligo- or polyformals, such as polydioxolane or polydioxepan, as comonomers.

Equally suitable polymers are oxymethylene terpolymers, prepared, for example, by reacting trioxane, one of the cyclic ethers described above and a third monomer, preferably a bifunctional compound of the formula

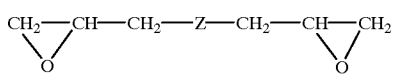

where Z is a chemical bond, —O—, or —ORO— ($R=C_1$- to $C_8$-alkylene or $C_2$-$C_8$-cycloalkylene).

Preferred monomers of this type are ethylene diglycide, diglycidyl ether and diethers from glycidyls and formaldehyde, dioxane or trioxane in a molar ratio of 2:1, and also diethers from 2 mol of glycidyl compound and 1 mol of an aliphatic diol having from 2 to 8 carbon atoms, such as the diglycidyl ethers of ethylene glycol, 1,4-butanediol, 1,3-butanediol, 1,3-cyclo-butanediol, 1,2-propanediol and 1,4-cyclohexanediol, to name only a few examples.

Processes for preparing the homo- and copolymers described above are known to the person skilled in the art and are described in the literature, and further details here are therefore unnecessary.

The preferred polyoxymethylene copolymers have melting points of at least 150° C. and molecular weights (weight average) $M_W$ in the range from 5000 to 200,000, preferably from 7000 to 150,000.

End-group-stabilized polyoxymethylene polymers which have C—C bonds at their chain ends are particularly preferred.

2. Polycarbonates and polyesters

Suitable polycarbonates are known per se. They are obtainable, for example, by interfacial polycondensation as in the processes of DE-B-1 300 266, or by reacting diphenyl carbonate with bisphenols as in the process of DE-A-14 95 730. A preferred bisphenol is 2,2-di(4-hydroxyphenyl) propane, which is referred to generally, and also below, as bisphenol A.

Instead of bisphenol A it is also possible to use other aromatic dihydroxy compounds, in particular 2,2-di(4-hydroxyphenyl)-pentane, 2,6-dihydroxynaphthalene, 4,4'-dihydroxydiphenyl sulfone, 4,4'-dihydroxydiphenyl ether, 4,4'-dihydroxydiphenyl sulfite, 4,4'-dihydroxydiphenyl methane, 1,1-di(4-hydroxy-phenyl)ethane or 4,4-dihydroxydiphenyl and also mixtures of the abovementioned dihydroxy compounds.

Particular preference is given to polycarbonates based on bisphenol A or bisphenol A together with up to 30 mol % of the abovementioned dihydroxy compounds.

The relative viscosity of these polycarbonates is generally in the range from 1.1 to 1.5, in particular from 1.28 to 1.4 (measured at 25° C. in a 0.5% strength by weight solution in dichloromethane).

Suitable polyesters are likewise known per se and described in the literature. In their main chain, they contain an aromatic ring which is derived from an aromatic dicarboxylic acid. The aromatic ring may also be substituted, e.g. by halogen, such as chlorine and bromine, or by $C_1$–$C_4$-alkyl, such as methyl, ethyl, isopropyl, n-propyl, n-butyl, isobutyl and/or tert-butyl.

The polyesters may be prepared by reacting aromatic dicarboxylic acids, their esters, or other ester-forming derivatives of the same, with aliphatic dihydroxy compounds, in a manner known per se.

Preferred dicarboxylic acids which may be mentioned are naphthalenedicarboxylic acid, terephthalic acid and isophthalic acid and mixtures of these. Up to 10 mol % of the aromatic dicarboxylic acids may be replaced by aliphatic or cycloaliphatic dicarboxylic acids, such as adipic acid, azelaic acid, sebacic acid, dodecanedioic acids and cyclohexanedicarboxylic acids.

Of the aliphatic dihydroxy compounds, preference is given to diols having from 2 to 6 carbon atoms, in particular 1,2-ethanediol, 1,4-butanediol, 1,6-hexanediol, 1,4-hexanediol, 1,4-cyclohexanediol and neopentyl glycol, or mixtures of these.

Particularly preferred polyesters which may be mentioned are polyalkylene terephthalates derived from alkanediols having from 2 to 6 carbon atoms. Of these, particular preference is given to polyethylene terephthalate, polyethylene naphthalate and polybutylene terephthalate.

The viscosity number of the polyesters is generally in the range from 60 to 200 ml/g (measured in a 0.5% strength by weight solution in a 1:1 mixture of phenol and o-dichlorobenzene at 25° C.)

3. Polyolefins

Those which may be mentioned here are very generally polyethylene and polypropylene, and also copolymers based on ethylene or propylene, if desired also with higher α-olefins. Corresponding products are obtainable under the tradenames Lupolen® and Novolen® from BASF Aktiengesellschaft.

4. Poly(meth)acrylates

Under this heading, mention is made in particular of polymethyl methacrylate (PMMA), and also copolymers based on methyl methacrylate with up to 40% by weight of other copolymerizable monomers, as obtainable, for example, under the designations Lucryl® from BASF Aktiengesellschaft or Plexiglas® from Röhm GmbH.

5. Polyamides

Preference is given very generally to any type of polyamide with aliphatic and partly crystalline, or partially aromatic and also amorphous structure, and blends of these. Corresponding products are available under the trade name Ultramid® from BASF AG.

6. Vinylaromatic polymers

The molecular weight of these polymers, which are known per se and commercially available, is generally in the range from 1,500 to 2,000,000, preferably in the range from 70,000 to 1,000,000.

Mention may be made here, merely in a representative capacity, of vinylaromatic polymers made from styrene, chlorostyrene, α-methylstyrene and p-methylstyrene; comonomers, such as (meth)acrylonitrile or (meth)acrylates, may be involved in the structure in subordinate proportions (preferably not more than 20% by weight, in particular not more than 8% by weight). Particularly preferred vinylaromatic polymers are polystyrene and impact-modified polystyrene. It is, of course, also possible to use mixtures of these polymers. Preparation is preferably by the process described in EP-A-302 485.

Preferred ASA polymers have been built up from a soft or rubber phase made from a graft polymer of:

$A_1$ from 50 to 90% by weight of a graft base based on
  $A_{11}$ from 95 to 99.9% by weight of a $C_2$-$C_{10}$-alkyl acrylate and
  $A_{12}$ from 0.1 to 5% by weight of a bifunctional monomer having two non-conjugated olefinic double bonds, and
$A_2$ from 10 to 50% by weight of a graft made from
  $A_{21}$ from 20 to 50% by weight of styrene or of substituted styrenes of the general formula depicted, or mixtures of is these, and
  $A_{22}$ from 10 to 80% by weight of acrylonitrile, methacrylonitrile, acrylates or methacrylates or mixtures of these, in a mixture with a hard matrix based on an SAN copolymer $A_3$) made from:

$A_{31}$ from 50 to 90% by weight, preferably from 55 to 90% by weight and in particular from 65 to 85% by weight of styrene and/or of substituted styrenes of the general formula depicted, and $A_{32}$ from 10 to 50% by weight, preferably from 10 to 45% by weight and in particular from 15 to 35% by weight, of acrylonitrile and/or methacrylonitrile.

Component $A_1$) is an elastomer which has a glass transition temperature of below −200° C., in particular below −300° C.

For preparing the elastomer, the main monomers $A_{11}$) used are acrylates having from 2 to 10 carbon atoms, in particular from 4 to 8 carbon atoms. Particularly preferred monomers which may be mentioned here are tert-butyl, isobutyl and n-butyl acrylate, and also 2-ethylhexyl acrylate, of which the two last named are particularly preferred.

Besides these acrylates, use is made of from 0.1 to 5% by weight, in particular from 1 to 4% by weight, based on the total weight $A_{11}+A_{12}$, of a polyfunctional monomer having at least two non-conjugated olefinic double bonds. Of these, use is preferably made of bifunctional compounds, i.e. those having two non-conjugated double bonds. Those which may be mentioned here as examples are divinylbenzene, diallyl fumarate, diallyl phthalate, triallyl cyanurate, triallyl isocyanurate, tricyclodecenyl acrylate and dihydrodicyclopentadienyl acrylate, of which the two last named are particularly preferred.

Processes for preparing the graft base $A_1$ are known per se and are described, for example, in DE-B 1 260 135. Corresponding products are also commercially available.

In some cases, preparation by emulsion polymerization has proven particularly advantageous.

The precise polymerization conditions, in particular the type, method of addition and amount of the emulsifier, are preferably selected so that the latex of the acrylate, which is at least to some extent crosslinked, has an average particle size (ponderal median $d_{50}$) in the range from about 200 to 700 nm, in particular from 250 to 600 nm. The latex preferably has a narrow particle size distribution, meaning that the quotient $$Q = \frac{d_{90} - d_{10}}{d_{50}}$$

is preferably less than 0.5, in particular less than 0.35.

The proportion of the graft base $A_1$ in the graft polymer $A_1+A_2$ is from 50 to 90% by weight, preferably from 55 to 85% by weight and in particular from 60 to 80% by weight, based on the total weight of $A_1+A_2$.

The graft base $A_1$ has, grafted onto the same, a graft shell $A_2$, obtainable by copolymerizing $A_{21}$ from 20 to 90% by weight, preferably from 30 to 90% by weight and in particular from 30 to 80% by weight, of styrene or of substituted styrenes of the general formula depicted

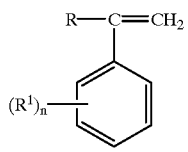

where R is alkyl having from 1 to 8 carbon atoms, hydrogen or halogen, and $R^1$ is alkyl having from 1 to 8 carbon atoms or halogen, and n is 0, 1, 2 or 3, and $A_{22}$ from 10 to 80% by weight, preferably from 10 to 70% by weight and in particular from 20 to 70% by weight, of acrylonitrile, methacrylonitrile, acrylates or methacrylates, or mixtures of these.

Examples of substituted styrenes are α-methylstyrene, p-methylstyrene, p-chlorostyrene and p-chloro-α-methylstyrene, and of these preference is given to styrene and α-methylstyrene.

Preferred acrylates or methacrylates are those whose homopolymers or, as appropriate, copolymers with the other monomers of component $A_{22}$) have glass transition temperatures above 20° C. However, it is in principle also possible to use other acrylates, preferably in amounts which give the entire component $A_2$ a glass transition temperature $T_g$ above 20° C.

Particular preference is given to esters of acrylic or methacrylic acid with $C_1$–$C_8$-alcohols and to esters containing epoxy groups, such as glycidyl acrylate and methacrylate. Very particularly preferred examples which may be mentioned are methyl methacrylate, tert-butyl methacrylate, glycidyl methacrylate and n-butyl acrylate. The last named is preferably not used in excessively high proportions because of its property of forming polymers with very low $T_g$.

The graft shell $A_2$) may be prepared in one step or in more than one, e.g. two or three, steps, without affecting its overall formulation.

The graft shell is preferably prepared in emulsion, as described, for example, in DE-C 12 60 135, DE-A 32 27 555, DE-A 31 49 357 and DE-A 34 14 118.

Depending on the conditions selected, the graft copolymerization gives a certain proportion of free copolymers of styrene and substituted styrene derivatives, respectively, and (meth)acrylonitrile and (meth)acrylates, respectively.

The graft copolymer $A_1+A_2$ generally has an average particle size of from 100 to 1000 nm, in particular from 200 to 700 nm, ($d_{50}$ ponderal median). The conditions for preparing the elastomer $A_1$) and for the grafting are therefore preferably selected in such a way as to give particle sizes in this range. Measures for this purpose are known and are described, for example, in DE-C 1 260 135 and DE-A 28 26 925, and also in Journal of Applied Polymer Science, Vol. 9 (1965), p. 2929 to 2938. The enlargement of the elastomer latex particles may be brought about, for example, by agglomeration.

For the purposes of this invention, the free, ungrafted homo- and copolymers produced during the graft copolymerization to prepare component $A_2$) are also counted with the graft polymer $A_1+A_2$).

Some preferred graft polymers may be cited below:

1: 60% by weight of graft base $A_1$ made from
  $A_{11}$ 98% by weight of n-butyl acrylate and
  $A_{12}$ 2% by weight of dihydrodicyclopentadienyl acrylate and
  40% by weight of graft shell $A_2$ made from
  $A_{21}$ 75% by weight of styrene and
  $A_{22}$ 25% by weight of acrylonitrile 2: Graft base as in 1 with 5% by weight of a first graft shell made from styrene and
  35% by weight of a second graft made from
  $A_{21}$ 75% by weight of styrene and
  $A_{22}$ 25% by weight of acrylonitrile 3: Graft base as in 1 with 13% by weight of a first graft made from styrene and 27% by weight of a second graft made from styrene and acrylonitrile in a weight ratio of 3:1

The products obtained as component $A_3$) may, for example, be prepared by the process described in DE-B 10

01 001 and DE-B 10 03 436. Copolymers of this type are also commercially available. The weight average molecular weight determined by light scattering is preferably in the range from 50,000 to 500,000, in particular from 100,000 to 250,000.

The weight ratio of $(A_1+A_2):A_3$ is in the range from 1:2.5 to 2.5:1, preferably from 1:2 to 2:1 and in particular from 1:1.5 to 1.5:1.

SAN polymers which are suitable as component A) have been described above (see $A_{31}$ and $A_{32}$).

The viscosity number of the SAN polymers, measured in accordance with DIN 53 727 in 0.5% strength by weight solution in dimethylformamide at 23° C. is generally in the range from 40 to 100 ml/g, preferably from 50 to 80 ml/g.

ABS polymers as polymer (A) in the novel polymer mixtures having more than one phase have the same structure as described above for ASA polymers. Instead of the acrylate rubber $A_1$) of the graft base in the ASA polymer use is usually made of conjugated dienes, preferably giving the following formulation for the graft base $A_4$:

$A_{41}$ from 70 to 100% by weight of a conjugated diene and $A_{42}$ from 0 to 30% by weight of a bifunctional monomer having two non-conjugated olefinic double bonds Graft $A_2$ and the hard matrix of the SAN copolymer $A_3$) remain unchanged in the formulation. Products of this type are commercially available. Preparation processes are known to the person skilled in the art, and it is therefore not necessary to give further information on this topic.

The weight ratio of $(A_4+A_2):A_3$ is in the range from 3:1 to 1:3, preferably from 2:1 to 1:2.

Particularly preferred formulations of the novel molding compositions comprise:

$A_1$) from 10 to 80% by weight of a polybutylene terephthalate, $A_2$) from 0 to 40% by weight of a polyethylene terephthalate, $A_3$) from 1 to 40% by weight of an ASA or ABS polymer or mixtures of these, B) from 1 to 35% by weight of a phosphazene as claimed in claim 1, and C) from 0 to 40% by weight of a fibrous or particulate filler or mixtures of these Products of this type are obtainable under the trademark Ultradur® S (previously Ultrablend® S) from BASF Aktiengesellschaft.

Other preferred formulations comprise $A_1$) from 10 to 80% by weight of a polycarbonate, $A_2$) from 0 to 40% by weight of a polyester, preferably polybutylene terephthalate, $A_3$) from 1 to 40% by weight of an ASA or ABS polymer or mixtures of these, B) from 1 to 35% by weight of a phosphazene as claimed in claim 1, and C) from 0 to 40% by weight of a fibrous or particulate filler or mixtures of these.

Products of this type are obtainable under the trademark Terblend® from BASF AG.

7. Polyarylene ethers

For the purposes of the present invention, polyarylene ethers are preferably either polyarylene ethers per se, polyarylene ether sulfides, polyarylene ether sulfones or polyarylene ether ketones. The arylene groups of these may be identical or different and, independently of one another, be aromatic radicals having from 6 to 18 carbon atoms. Examples of suitable arylene radicals are phenylene, biphenylene, terphenylene, 1,5-naphthylene, 1,6-naphthylene, 1,5-anthrylene, 9,10-anthrylene and 2,6-anthrylene. Of these, preference is given to 1,4-phenylene and 4,4'-biphenylene. These aromatic radicals are preferably unsubstituted, but they may carry one or more substituents. Examples of suitable substituents are alkyl, arylalkyl, aryl, nitro, cyano and alkoxy, and also heteroaromatics, such as pyridine, and halogen. Preferred substituents include alkyl having up to 10 carbon atoms, such as methyl, ethyl, isopropyl, n-hexyl, isohexyl, $C_1$–$C_{10}$-alkoxy, such as methoxy, ethoxy, n-propoxy, n-butoxy, aryl having up to 20 carbon atoms, such as phenyl or naphthyl, and also fluorine and chlorine. Besides —O—, these may be linked, for example, via —S—, —SO—, —SO$_2$—, —CO—, —N=N—, —COO—, alkylene or a chemical bond. The arylene groups in the polyarylene ethers may also be linked with one another via different groups.

Preferred polyarylene ethers include those having recurring units of the general formula depicted

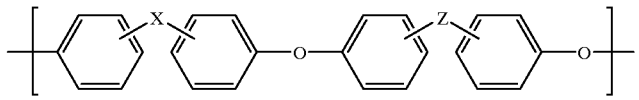

It is also possible to use their ring-substituted derivatives. Preferred substituents are $C_1$–$C_6$-alkyl, such as methyl, ethyl or tert-butyl, $C_1$–$C_6$-alkoxy, such as methoxy or ethoxy, aryl, in particular phenyl, chlorine or fluorine. The variable X may be —SO$_2$—, —SO—, —S—, —O—, CO, —N=N—, —RC=CR$^a$—, —CR$^b$R$^c$— or a chemical bond. The variable Z may be —SO$_2$—, —SO—, —CO—, —O—, —N=N— or —RC=CR$^a$. Each of R and R$^a$ here is hydrogen, $C_1$–$C_6$-alkyl, e.g. methyl, n-propyl or n-hexyl, $C_1$–$C_6$-alkoxy, including methoxy, ethoxy and butoxy, or aryl, in particular phenyl. Each of R$^b$ and R$^c$ may be hydrogen or $C_1$–$C_6$-alkyl, in particular methyl. However, they may also be linked with one another to give a $C_4$–$C_{10}$-cyclo-alkyl ring, preferably a cyclopentyl or cyclohexyl ring, which may in turn be substituted with one or more alkyl groups, preferably methyl. In addition, R$^b$ and R$^c$ may also be $C_1$–$C_6$-alkoxy, e.g. methoxy or ethoxy, or aryl, particularly phenyl. Each of the abovementioned groups may in turn be substituted with chlorine or fluorine.

The polyarylene ethers may also be copolymers or block copolymers, comprising polyarylene ether segments and segments of other thermoplastic polymers, such as polyamides, polyesters, aromatic polycarbonates, polyestercarbonates, polysiloxanes, polyimides or polyetherimides. The molecular weights of the blocks or of the graft branches in the copolymers is generally in the range from 1000 to 30,000 g/mol. The blocks of different structure may be arranged alternately or randomly. The proportion by weight of the polyarylene ether segments in the copolymers or block copolymers is generally at least 3% by weight, preferably at lest 10% by weight. The proportion by weight of the polyarylene ether sulfones or polyarylene ether ketones may be up to 97% by weight. It is preferable to use copolymers or block copolymers with a proportion by weight of polyarylene ether segments of up to 90%. Particular preference is given to copolymers or block copolymers with from 20 to 80% by weight of polyarylene ether segments.

The polyarylene ethers generally have average molecular weights $\overline{M}_n$ (number average) in the range from 10,000 to 60,000 g/mol and viscosity numbers from 30 to 150 ml/g. Depending on the solubility of the polyarylene ethers, the viscosity numbers are measured either in 1% strength by weight N-methylpyrrolidone solution, in mixtures of phenol and o-dichlorobenzene, or in 96% strength sulfuric acid, in each case at 20 or 25° C.

The polyarylene ethers (A) are known per se or may be prepared by methods known per se.

Polyphenylene ethers, for example, may therefore be prepared by oxidative coupling of phenols. Polyarylene ether sulfones or polyarylene ether ketones are prepared, for example, by condensing aromatic bishalogen compounds and the alkali metal double salts of aromatic bisphenols. They may also be prepared, for example, by autocondensation of alkali metal salts of aromatic halophenols in the presence of a catalyst.

Preferred process conditions for synthesizing polyarylene ether sulfones or polyarylene ether ketones are described, for example, in EP-A-113 112 and 135 130.

The preferred polyarylene ethers generally have a melting point of, respectively, at least 320° C. (polyarylene ether sulfones) and at least 370° C. (polyarylene ether ketones).

According to the invention, the molding compositions may comprise, as component A), polyarylene ether sulfones or polyarylene ether ketones, in both cases obtainable by reacting a polyarylene ether sulfone or polyarylene ether ketone $A_1$) with a reactive compound. The reactive compounds contain, besides a C—C double or triple bond, one or more carbonyl, carboxylic acid, carboxylate, anhydride, imide, carboxylic ester, amino, hydroxyl, epoxy, oxazoline, urethane, urea, lactam or halobenzyl group(s).

Examples of typical suitable compounds are maleic acid, methyl-maleic acid, itaconic acid, tetrahydrophthalic acid, the anhydrides and imides thereof, fumaric acid, the mono- and diesters of these acids, e.g. of $C_1$–$C_{18}$-alkanols, the mono- or diamides of these acids, such as N-phenylmaleimide and maleic hydrazide.

Preference is given to the use of modified polyarylene ether sulfones or polyarylene ether ketones which in both cases have been obtained by reacting from 80 to 99.9% by weight, in particular from 90 to 99% by weight, of the unmodified polyarylene ether sulfones or polyarylene ether ketones with from 0.1 to 20% by weight, in particular from 1 to 10% by weight, of the reactive compound.

The free-radical initiators used may generally be the compounds described in the technical literature (e.g. J. K. Kochi, "Free Radicals", J. Wiley, New York, 1973).

The free-radical initiators are generally used in amounts of from about 0.01 to about 1% by weight, based on the polyarylene ether sulfones or polyarylene ether ketones used. It is, of course, also possible to use mixtures of different free-radical initiators.

WO 87/00540, inter alia, has disclosed correspondingly modified polyphenylene ethers, which are preferably mixed with polyamides as blend component.

The novel molding compositions comprise, as component B), from 0.1 to 50% by weight, preferably from 1 to 35% by weight and in particular from 5 to 25% by weight, of a phosphazene of the general formula I $$(PN_{2-x}H_{1-y})_z \qquad \qquad I$$

where the numerical values of x, y and z, independently of one another, are:

1 > x > 0.05, preferably 0.8 > x > 0.15, in particular 0.7 > x > 0.3

1 > y > 0.05, preferably 0.7 > y > 0.05, in particular 0.6 > y > 0.1 and z > 1

Examples of suitable preparation processes are described in Gmelin's Handbuch der anorganischen Chemie, 8th edition (1965), Verlag Chemie, Weinheim/Bergstr.; System No. 16 (phosphorus), Part C, p. 302–329.

Phosphazenes I are generally obtainable by reacting a phosphorus halide or a phosphorus nitrogen halide with ammonia, removing firstly ammonium halide and then ammonia, while the temperature is raised from the respective starting temperature to a temperature in the range from 500 to 850° C., in particular from 550 to 780° C. and very particularly from 580 to 780° C.

Suitable phosphorus halides or phosphorus nitrogen halides are those of 3- or 5-valent phosphorus, and preference is given to chlorides, such as $PCl_3$, $PCl_5$ or $(PNCl_2)_3$. In the reaction with ammonia, starting temperatures generally depend, for example, on the particular material condition of the halide used, for example room temperature for the reaction of $PCl_5$ with ammonia:

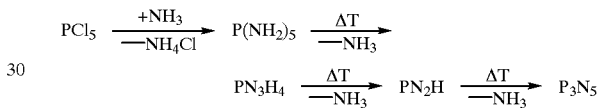

While ammonium chloride is removed by sublimation, rising temperature gives formation, formally, of the compounds $P(NH_2)_5$, $PN_3H_4$, $PN_2H$ and $P_3N_5$.

The formulae here are those which may be determined by elemental analysis (also often termed the abundance of the various elements relative to one another).

The elements P, N and H constituting these compounds are probably present here in a three-dimensional lattice, as shown below. Mixtures of oligomeric to polymeric compounds with undefined degree of condensation z are present.

Increasingly crosslinked phosphazene structures of the stoichiometry of formula I are developed with rising temperature and cleavage of ammonia.

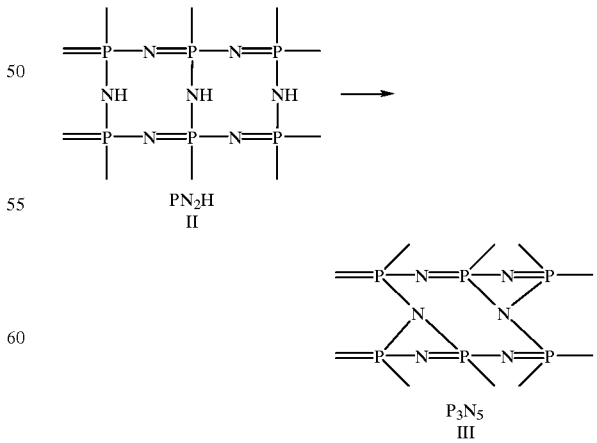

The phosphazenes I used according to the invention in the molding compositions probably have structures intermediate between II and III (continuous transition between the structures), the degree of condensation z of which, as given in formula I, is variable and generally cannot be quantitatively determined.

It is likely that z may generally be infinite, and can usually take a value greater than $10^{25}$. z is frequently up to $10^{30}$, preferably up to $10^{25}$.

Definition of these compounds is therefore usually restricted to giving their elemental make-up (also frequently termed the abundance of the various elements relative to one another), which may be determined by elemental analysis.

The novel thermoplastic molding compositions may also comprise, as component C) conventional additives and processing aids. The proportion of these additives is generally not more than 70% by weight, in particular not more than 50% by weight, based on the total weight of components A) to C).

Additives which may be mentioned are impact modifiers (also termed elastomeric polymers or elastomers), which may be present in amounts of up to 20% by weight, preferably up to 15% by weight.

Conventional rubbers are suitable, e.g. ethylene copolymers with reactive groups, acrylate rubber and polymers of conjugated dienes, such as polybutadiene rubber and polyisoprene rubber. The diene polymers may, in a manner known per se, be partially or completely hydrogenated. Other examples of possible rubbers are: hydrogenated styrene butadiene rubber, ethylene-propylene-diene rubber, polybutylene rubbers, polyoctenamer rubbers, ionomers, block copolymers of vinylaromatic monomers with dienes, such as butadiene or isoprene (known per se from EP-A 62 282) with the structure $M^1M^2$-, $M^1M^2M^1M^2$- or $M^1M^2M^1$-, where these block polymers may also comprise segments with random distribution, and also star-block copolymers. Polymers which have proven particularly suitable are those of conjugated dienes, such as polybutadiene rubber or polyisoprene rubber. Synthetic rubbers of this type are familiar to the person skilled in the art and are reviewed in Ullmanns Encyklopädie der Technischen Chemie, 4th edition, Vol. 13, pages 595 to 634, Verlag Chemie GmbH, Weinheim, 1977.

Other additives which may be mentioned are heat stabilizers and light stabilizers, lubricants, mold-release agents, colorants, such as dyes and pigments in usual amounts. Further additives are reinforcing agents, such as glass fibers, asbestos fibers, carbon fibers, aromatic polyamide fibers and/or fillers, gypsum fibers, synthetic calcium silicates, kaolin, calcined kaolin, wollastonite, talc and chalk.

Low-molecular-weight polymers are also possible additives, particular preference being given to polyethylene wax as lubricant.

The desired properties of the end products can be controlled to a large extent via the type and amount of these additives.

The novel molding compositions may be prepared by processes known per se. In a preferred embodiment, preparation is by adding component B), and also C), to the melt of component A).

It is expedient to use extruders for this purpose, e.g. single-screw extruders or twin-screw extruders, or other conventional plasticating equipment, such as Brabender mixers or Banbury mixers.

The plastics mixtures may, given the presence of a thermoplastic polycondensate, then be subjected to another thermal treatment, i.e. a solid-phase post-condensation. The molding composition, in the form appropriate for the particular process, is annealed in annealing assemblies, such as a tumbling mixer or continuously- or batch-operated conditioning tubes, until the desired viscosity number VN or relative viscosity $\eta$rel, for example of the polyamide, is achieved. The temperature range for the annealing depends on the melting point of the pure component A). Preferred temperature ranges are below the respective melting point of A) by from 5 to 50° C., preferably from 20 to 30° C. The process preferably takes place in an inert gas atmosphere, preferred inert gases being nitrogen and superheated steam.

The residence times are generally from 0.5 to 50 hours, preferably from 4 to 20 hours. Moldings are then produced from the molding compositions by means of conventional apparatuses.

The novel molding compositions have good processability, and also good flame retardancy, in particular no burning drops. They are therefore suitable for producing fibers, films and moldings of any type, in particular those used in the electrical sector, and also the electronics industry (e.g. casings in the office and IT sectors, coil formers, circuit breakers, multipoint connectors, switch parts, covers and computer cases).

EXAMPLES

Component A

A1: Poly-$\epsilon$-caprolactam with a viscosity number VN of 151 ml/g, measured as 0.5% strength solution in 96% strength by weight $H_2SO_4$ at 25° C.; Ultramid® B3 from BASF AG.

A2: Nylon-6,6 with a VN of 148 ml/g, Ultramid® A3 from BASF AG.

A3: Polybutylene terephthalate with a VN of 130 ml/g, measured in phenol/dichlorobenzene (1:1) at 25° C., Ultradur® B4500 from BASF AG.

A4: Poly-2,6-dimethyl-1,4-phenylene ether with an average molecular weight ($\overline{M}_W$) of 40,000 (GPC in chloroform against a polystyrene standard at 25° C.).

A5: Impact-modified polystyrene KR 2756 from BASF AG with 9% by weight of polybutadiene. The median particle size of the soft component ($d_{50}$) was 1.9 $\mu$m.

A6: Polycarbonate made from bisphenol A/phosgene with a VN of 62.4 ml/g, measured in dichloromethane as 0.5 strength by weight solution at 23° C.

A7: An ASA graft polymer built up from a graft base of $A_{11}$: 98% by weight of n-butyl acrylate and $A_{12}$: 2% by weight of tricyclodecenyl acrylate and a graft of $A_{21}$: 75% by weight of styrene $A_{22}$: 25% by weight of acrylonitrile in a mixture with a hard matrix based on an SAN polymer built up from:

$A_{31}$: 80% by weight of styrene and $A_{32}$: 20% by weight of acrylonitrile.

The viscosity number of the hard matrix was 83 ml/g, measured on a 0.5% strength by weight solution in dimethylformamide at 23° C.

Preparation of Component B

To synthesize phosphazenes of the general formula $(PN_{2-x}H_{1-y})_z$, 800 g of $PCl_5$ was placed in a 6 l rotary tubular vessel made from quartz glass. With rotation at about 1–5 rpm, the $PCl_5$ was reacted by introducing a stream of ammonia gas at 48 Nl/h. During this, the temperature was brought to 100° C. within a period of 5 h and held for 10 h at that level. The temperature was then increased to 340° C.

within a period of 5 h and held for 5 h. The final temperature desired in each case, which was from 470 to 800° C., was then established using a heating rate of 20° C./h. This final temperature was held for 5 h. Ammonium chloride produced as by-product during the reaction evaporated completely ($T_{sub}$=340° C.) and was discharged with the gas stream. After cooling the furnace, the desired phosphazenes could be obtained as colorless solids.

The make-up of the resultant phosphazenes was determined by elemental analysis.

B/1 $PN_{1.39}H_{0.46}$ prepared at a final reaction temperature of 780° C.

B/2 $PN_{1.97}H_{1.00}$ prepared at a final reaction temperature of 450° C. (for comparison in accordance with EP 417 839)

Component C

C1: Silanized chopped glass fiber with an average diameter of 10 μm

C2: Styrene-butadiene-styrene three-block copolymer (hydrogenated) with a styrene content of 29% by weight (Kraton® G1650 from Shell AG)

Preparation of the Thermoplastic Molding Compositions

Components A) to C), in the proportions given in the table, were blended in a ZSK 25 at 5 kg/h and 120 rpm, and the extrudate was cooled in a water bath and then pelletized, and also dried at 80° C. for 10 h under reduced pressure. The chopped glass fibers were metered into the melt stream.

The processing temperatures are given in Table 1.

An injection molding machine was used to produce 1/16″ test specimens from the pellets at 260 and 280° C., respectively (Examples 4, 5 and 10). Specimens were tested after the usual conditioning in accordance with UL94 (flammability test).

The make-ups of the molding compositions and the test results are given in the table.

TABLE

| Example | Make-up [% by weight] | Processing temperature [° C.] | UL94 [1/16″] | Burning drops |
|---|---|---|---|---|
| 1 | 80 A1 20 B1 | 260* | V-0 | no |
| 2 | 60 A1 15 B1 25 C1 | 260 | V-0 | no |
| 3* | 55 A1 20 B2 25 C1 | 260 | V-2 | yes |
| 4 | 85 A2 15 B1 | 280 | V-0 | no |
| 5 | 60 A2 15 B1 25 C1 | 280 | V-2 | no |
| 6* | 60 A2 15 B2 25 C1 | 280 | V-2 | yes |
| 7 | 80 A3 20 B1 | 260 | V-0 | no |
| 8 | 55 A3 20 B1 25 C1 | 260 | V-0 | no |
| 9* | 55 A3 20 B2 25 C1 | 260 | n.c. | yes |
| 10 | 39.5 A4 45 A5 12 B/1 3.5 C2 | 280 | V-0 | no |
| 11 | 66 A6 22 A7 12 B1 | 260 | V-0 | no |

*for comparison
n.c. = not classified

We claim:

1. A flame-retardant thermoplastic molding composition comprising
   A) from 5 to 99% by weight of a thermoplastic polymer,
   B) from 0.1 to 50% by weight of a phosphazene of the general formula I $$(PN_{2-x}H_{1-y})_z \qquad \text{I}$$

where the numerical values of x, y and z, independently of one another, are as follows:
1>x>0.05
1>y>0.05
z>1, and C) from 0 to 70% by weight of other additives and processing aids, where the total of the percentages by weight of components A) to C) is 100%, and where component B) is obtained by reacting a phosphorus halide or a phosphorus nitrogen halide with ammonia, where firstly ammonium halide and then ammonia are removed, while the temperature is raised from the respective starting temperature to a temperature in the range of from 500 to 850° C.

2. A flame-retardant thermoplastic molding composition as claimed in claim 1, in which the thermoplastic polymer A) is selected from the class consisting of polyesters, polycarbonates, polyamides, polyolefins, polyoxymethylenes, vinylaromatic polymers, polyarylene ethers and poly(meth)acrylates and mixtures of these.

3. A flame-retardant thermoplastic molding composition as claimed in claim 1, where the temperature is raised from the respective starting temperature to a temperature in the range from 550 to 780° C.

4. A flame-retardant thermoplastic molding composition as claimed in claim 1, comprising
   A1) from 10 to 80% by weight of a polybutylene terephthalate,
   A2) from 0 to 40% by weight of a polyethylene terephthalate,
   A3) from 1 to 40% by weight of an ASA or ABS polymer or mixtures of these,
   B) from 1 to 35% by weight of a phosphazene as claimed in claim 1, and
   C) from 0 to 40% by weight of a fibrous or particulate filler or mixtures of these.

5. A flame-retardant thermoplastic molding composition as claimed in claim 1, comprising
   A1) from 10 to 80% by weight of a polycarbonate,
   A2) from 0 to 40% by weight of a polyester,
   A3) from 1 to 40% by weight of an ASA or ABS polymer or mixtures of these,
   B) from 1 to 35% by weight of a phosphazene as claimed in claim 1, and
   C) from 0 to 40% by weight of a fibrous or particulate filler or mixtures of these.

6. A fiber or film obtained from the flame-retardant thermoplastic molding composition as claimed in claim 1.

7. A molding obtained from the flame-retardant thermoplastic molding composition as claimed in claim 1.

8. A coil former, a circuit breaker, a multipoint connector, a switch part, a cover or a computer case obtained from the flame retardant thermoplastic molding composition as claimed in claim 1.

* * * * *